(12) United States Patent
Young et al.

(10) Patent No.: US 11,132,918 B2
(45) Date of Patent: *Sep. 28, 2021

(54) SYSTEMS, ARTICLES AND METHODS RELATED TO PROVIDING CUSTOMIZED COOKING INSTRUCTION

(71) Applicant: Breville USA, Inc., Torrance, CA (US)

(72) Inventors: Christopher Charles Young, Seattle, WA (US); Douglas Baldwin, Arvada, CO (US); Michael Natkin, Seattle, WA (US); Nelson Timothy Salazar, Seattle, WA (US)

(73) Assignee: BREVILLE USA, INC., Torrance, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/789,414

(22) Filed: Jul. 1, 2015

(65) Prior Publication Data

US 2016/0005327 A1 Jan. 7, 2016

Related U.S. Application Data

(60) Provisional application No. 62/021,530, filed on Jul. 7, 2014.

(51) Int. Cl.
*G09B 19/00* (2006.01)
*G09B 5/02* (2006.01)
*G09B 5/06* (2006.01)

(52) U.S. Cl.
CPC .......... *G09B 19/00* (2013.01); *G09B 5/02* (2013.01); *G09B 5/06* (2013.01); *G09B 5/065* (2013.01); *G09B 19/0092* (2013.01)

(58) Field of Classification Search
CPC .... G09B 19/00; G09B 19/0092; G09B 5/065; H04L 65/60

(Continued)

(56) References Cited

U.S. PATENT DOCUMENTS 4,309,584 A 1/1982 Terakami et al.
4,390,766 A 6/1983 Horinouchi et al.
(Continued)

FOREIGN PATENT DOCUMENTS

CN 102608929 A 7/2012
EP 2 767 159 B1 11/2015
(Continued)

OTHER PUBLICATIONS

Kasper, Lynne Rosetto, "There's more than one way to cook an egg. Dave Arnold has 11," retrieved from URL https://web.archive.org/web/20130416002008/https://www.splendidtable.org/story/theres-more-than-one-way-to-cook-an-egg-dave-arnold-has-11 on Sep. 5, 2018; Wayback Machine date of Apr. 16, 2013.*

(Continued)

*Primary Examiner* — Michael C Grant
(74) *Attorney, Agent, or Firm* — Seed IP Law Group LLP

(57) ABSTRACT

Systems, methods, and articles to provide customized cooking instructions to users via a communications device. The user is provided with audio/visual prompts depicting one or more ending characteristics of a food product, such as texture or doneness. The user provides a selection of the one or more ending characteristics according to the user's preferences. A processor-based device determines one or more output food preparation parameters based on the user's selection of the one or more ending characteristics for the food product. The one or more determined output food preparation parameters are provided to a communication device of the user so that the user may cook the food product according to the output food preparation parameters.

26 Claims, 12 Drawing Sheets

(58) Field of Classification Search
USPC .................................................. 434/127
See application file for complete search history.

(56) References Cited

U.S. PATENT DOCUMENTS

| | | | |
|---|---|---|---|
| 4,807,169 | A | 2/1989 | Overbeck |
| 5,096,725 | A | 3/1992 | Kim |
| 5,183,984 | A | 2/1993 | Nakagawa et al. |
| 5,352,874 | A | 10/1994 | Gong et al. |
| 5,750,960 | A | 5/1998 | Bresolin |
| 5,877,477 | A | 3/1999 | Petty et al. |
| 6,539,842 | B1 | 4/2003 | Chapman et al. |
| 6,568,848 | B1 | 5/2003 | Chapman et al. |
| 6,712,505 | B2 | 3/2004 | Chapman et al. |
| 6,759,637 | B2 | 7/2004 | Kim et al. |
| 6,789,067 | B1 | 9/2004 | Liebenow |
| 6,811,308 | B2 | 11/2004 | Chapman et al. |
| 6,846,453 | B1 | 1/2005 | Uesaka et al. |
| 6,933,483 | B2 | 8/2005 | Chun et al. |
| 7,102,107 | B1 | 9/2006 | Chapman |
| 7,372,368 | B2 | 5/2008 | Chapman et al. |
| 7,605,349 | B2 | 10/2009 | Steinman et al. |
| 7,685,256 | B2 | 3/2010 | Kudo et al. |
| 7,722,248 | B1 | 5/2010 | Chapman et al. |
| 8,240,914 | B1 | 8/2012 | Chapman et al. |
| 8,323,026 | B2 | 12/2012 | Do et al. |
| 8,342,847 | B2 | 1/2013 | Grigsby et al. |
| 8,419,434 | B2 | 4/2013 | Do et al. |
| 8,455,028 | B2 | 6/2013 | Breunig et al. |
| 2003/0037681 | A1 | 2/2003 | Zhu et al. |
| 2004/0267382 | A1 | 12/2004 | Cunningham et al. |
| 2005/0193901 | A1 | 9/2005 | Buehler et al. |
| 2006/0136078 | A1 | 6/2006 | Chen et al. |
| 2007/0158335 | A1 | 7/2007 | Mansbery et al. |
| 2008/0136785 | A1 | 6/2008 | Baudisch et al. |
| 2008/0140862 | A1 | 6/2008 | Elston et al. |
| 2008/0222553 | A1 | 9/2008 | Benjamin-Lambert et al. |
| 2009/0029326 | A1 | 1/2009 | Kark et al. |
| 2009/0236335 | A1 | 9/2009 | Ben-Shmuel et al. |
| 2009/0258331 | A1 | 10/2009 | Do et al. |
| 2010/0147823 | A1 | 6/2010 | Anderson et al. |
| 2010/0292998 | A1 | 11/2010 | Bodlaender et al. |
| 2010/0313768 | A1* | 12/2010 | Koether ............ A47J 27/62 99/325 |
| 2012/0032524 | A1 | 2/2012 | Baarman et al. |
| 2013/0092680 | A1 | 4/2013 | Cartwright et al. |
| 2013/0125763 | A1 | 5/2013 | Valance |
| 2013/0306627 | A1 | 11/2013 | Libman et al. |
| 2014/0292536 | A1 | 10/2014 | Barth et al. |
| 2014/0295822 | A1 | 10/2014 | Koo et al. |
| 2014/0314921 | A1* | 10/2014 | Kuempel ............ H04L 67/10 426/231 |
| 2015/0212661 | A1 | 7/2015 | Robberechts et al. |
| 2015/0257574 | A1* | 9/2015 | Hoare ............... A47J 27/10 99/342 |
| 2015/0294225 | A1 | 10/2015 | Takei et al. |
| 2016/0005327 | A1 | 1/2016 | Young et al. |
| 2016/0073451 | A1 | 3/2016 | Reischmann et al. |
| 2016/0100717 | A1 | 4/2016 | Zhu |
| 2016/0174748 | A1 | 6/2016 | Baldwin et al. |
| 2016/0198885 | A1 | 7/2016 | Logan et al. |
| 2016/0220064 | A1 | 8/2016 | Barton et al. |
| 2016/0235239 | A1 | 8/2016 | Patadia |
| 2016/0315784 | A1 | 10/2016 | Wu et al. |
| 2016/0324366 | A1 | 11/2016 | Wu et al. |
| 2017/0007064 | A1 | 1/2017 | Chen |
| 2017/0020324 | A1 | 1/2017 | Young et al. |
| 2017/0139385 | A1 | 5/2017 | Salazar et al. |
| 2017/0162073 | A1 | 6/2017 | Salazar et al. |

FOREIGN PATENT DOCUMENTS

| | | | |
|---|---|---|---|
| JP | 11-45297 | A | 2/1999 |
| JP | 2002-63178 | A | 2/2002 |
| JP | 2003-50907 | A | 2/2003 |
| JP | 3602400 | B2 | 12/2004 |
| JP | 4288208 | B2 | 7/2009 |
| JP | 2010-272010 | A | 12/2010 |
| KR | 10-1990-0012053 | A | 8/1990 |
| KR | 10-2008-0089947 | A | 10/2008 |
| KR | 10-2011-0080988 | A | 7/2011 |
| KR | 10-2012-0029027 | A | 3/2012 |
| KR | 10-2014-0051153 | A | 4/2014 |
| KR | 10-2014-0103798 | A | 8/2014 |
| WO | 2007/051049 | A2 | 5/2007 |
| WO | 2012/092641 | A1 | 7/2012 |
| WO | 2014/019018 | A1 | 2/2014 |
| WO | 2017/015270 | A1 | 1/2017 |

OTHER PUBLICATIONS

Baldwin et al., "Food Preparation Guidance System," U.S. Appl. No. 14/974,635, filed Dec. 18, 2015, 61 pages.
International Search Report and Written Opinion of the International Searching Authority, dated May 12, 2016, for International Application No. PCT/US2016/015388, 9 pages.
Young et al., "Food Preparation Control System," U.S. Appl. No. 15/009,525, filed Jan. 28, 2016, 72 pages.
International Search Report, dated Oct. 27, 2016, for International Application No. PCT/US2016/042924, 5 pages.
Written Opinion of the International Searching Authority, dated Oct. 27, 2016, for International Application No. PCT/US2016/042924, 12 pages.
Young et al., "Food Preparation Control System," U.S. Appl. No. 15/214,056, filed Jul. 19, 2016, 95 pages.
Young et al., "Data Aggregation and Personalization for Remotely Controlled Cooking Devices," U.S. Appl. No. 15/351,091, filed Nov. 14, 2016, 85 pages.
International Search Report and Written Opinion, dated Jan. 25, 2017, for International Application No. PCT/US2016/057205, 16 pages.
International Search Report and Written Opinion, dated Jan. 31, 2017, for International Application No. PCT/US2016/061886, 9 pages.
International Search Report and Written Opinion, dated Oct. 27, 2016, for International Application No. PCT/US2016/042924, 17 pages.
International Search Report dated Sep. 23, 2015 for International Application No. PCT/US2015/038858, 3 pages.
Written Opinion dated Sep. 23, 2015 for International Application No. PCT/US2015/038858, 11 pages.
International Search Report, dated Apr. 6, 2016, for corresponding International Application No. PCT/US2015/066697, 6 pages.
Written Opinion of the International Searching Authority, dated Apr. 6, 2016, for corresponding International Application No. PCT/US2015/066697, 11 pages.
Final Office Action dated Aug. 28, 2017 for U.S. Appl. No. 15/432,790 for Young, C. et al., filed Feb. 14, 2017.
Non-Final Office Action dated Aug. 25, 2017 for U.S. Appl. No. 15/432,792 for Young, C. et al., filed Feb. 14, 2017.
Non-Final Office Action dated May 1, 2017 for U.S. Appl. No. 15/432,790 for Young, C. et al., filed Feb. 14, 2017.
Young et al., "Systems, Articles and Methods Related to Providing Customized Cooking Instruction", U.S. Appl. No. 15/432,790, filed Feb. 14, 2017.
EPO 94(3) communication in EP application No. 15818874.8 dated Jun. 5, 2018, 10 pages.
Japanese Office Action dated Jun. 4, 2019, for Japanese Application No. 2017-522320, 8 pages. (w/English translation).

* cited by examiner

SYSTEMS, ARTICLES AND METHODS RELATED TO PROVIDING CUSTOMIZED COOKING INSTRUCTION

CROSS REFERENCE TO RELATED APPLICATION

This application claims priority to U.S. Provisional Patent Application No. 62/021,530 entitled "Systems, Articles And Methods Related To Providing Customized Cooking Instruction" and filed on Jul. 7, 2014, the contents of which is hereby incorporated by reference herein in its entirety for all purposes.

BACKGROUND

1. Technical Field

The present disclosure generally relates to food preparation, and in particular relates to providing food preparation instruction via computing devices.

2. Description of the Related Art

Cooking is the art of preparing food for consumption with the use of heat. There are numerous methods of cooking, most of which have been known for many years. These methods include baking, roasting, frying, grilling, barbecuing, smoking, boiling, steaming and braising, to name a few. Various methods use differing levels of heat and moisture and vary in cooking time. The particular method chosen normally affects the result because some foods are more appropriate to some methods than others.

Cooking recipes are a set of instructions that describes how to prepare or make a food product. Recipes may generally include various information about a food product such as the required ingredients to prepare the food product along with the quantities and proportions of each of the ingredients, the necessary equipment, an ordered list of steps and techniques, one or more cooking times, one or more cooking temperatures, etc.

When cooking some food products, such as eggs and meat, variations in the cooking time and cooking temperature can have significant effects on the resulting texture and taste. As people's tastes vary, different people have diverse preferences regarding the texture, taste, or other properties of cooked food products. Often it is difficult for a person cooking a food product to know precisely how to cook the food product to achieve a desired result, such as a desired texture, consistency, or doneness, for the food product.

BRIEF SUMMARY

A method of operation in a processor-based food preparation guidance system may be summarized as including receiving, via a communications device, a request for preparation guidance for a food product; in response to the received request, causing at least one of a first set of at least two graphical prompts to be displayed by the communications device, each of the graphical prompts in the first set of at least two graphical prompts depicting a respective gradation of at least one first characteristic of the food product, the respective gradations being different from one another; receiving, via the communications device, a selection of one of the gradations of the at least one first characteristic of the food product; and determining at least one food preparation parameter for the food product based at least in part on the received selection of one of the gradations of the at least one first characteristic of the food product.

The method may further include causing the at least one food preparation parameter to be displayed by the communications device. Receiving a selection of one of the gradations of the at least one first characteristic of the food product may include receiving, via a communications device, a selection of one of the gradations by a processor-based food preparation guidance system over a data network, and determining at least one food preparation parameter may include determining at least one food preparation parameter by the food preparation guidance system, and wherein causing the at least one food preparation parameter to be displayed by the communications device may include sending, by the food preparation guidance system, data comprising the at least one food preparation parameter to the communications device over the data network. Causing at least one of a first set of at least two graphical prompts to be displayed by the communications device may include causing at least one of a first set of at least two graphical prompts to be displayed by the communications device, each of the graphical prompts in the first set of at least two graphical prompts depicting respective different textures, consistencies, or doneness for the food product. Receiving a selection of one of the gradations of the at least one first characteristic of the food product may include receiving, via a communications device, a selection of one of the gradations by a processor-based food preparation guidance system over a data network, and determining at least one food preparation parameter may include determining at least one food preparation parameter by the food preparation guidance system. Causing at least one of a first set of at least two graphical prompts to be displayed by the communications device may include causing at least one of a first set of images or videos to be displayed by the communications device.

The method may further include in response to receiving a selection of one of the gradations of the at least one first characteristic of the food product, causing at least one of a second set of at least two graphical prompts to be displayed by the communications device, each of the graphical prompts in the second set of at least two graphical prompts depicting a different gradation of at least one second characteristic of the food product; and receiving, via the communications device, a selection of one of the gradations of the at least one second characteristic of the food product; wherein determining at least one food preparation parameter for the food product may include determining at least one food preparation parameter for the food product based at least in part on the received selection of one of the gradations of the at least one second characteristic of the food product.

Causing at least one of a second set of at least two graphical prompts to be displayed by the communications device may include causing at least one of a second set of at least two graphical prompts to be displayed by the communications device based at least in part on the received selection of one of the gradations of the at least one first characteristic of the food product. Determining at least one food preparation parameter for the food product may include determine at least one of a cooking temperature or a cooking time for the food product.

Receiving a request for preparation guidance for a food product may include receiving a request for preparation guidance for an egg, the egg having a white portion and a yolk portion, and wherein causing at least one of a first set of at least two graphical prompts to be displayed by the communications device may include causing at least one of a first set of images or videos to be displayed by the communications device, each of the images or videos in the first set of images or videos depicting a respective different texture, consistency, or doneness of one of the white portion and the yolk portion, and wherein receiving a selection of one of the gradations of the at least one first characteristic of the food product may include receiving a selection of one of the images or videos in the first set of images or videos may further include in response to receiving a selection of one of the images or videos in the first set of images or videos, causing at least one of a second set of images or videos to be displayed by the communications device, each of the images or videos in the second set of images or videos depicting a different texture of the other of the white portion and the yolk portion; and receiving, via the communications device, a selection of one of the images or videos in the second set of images or videos; wherein determining at least one food preparation parameter for the food product may include determining at least one food preparation parameter for the egg based at least in part on the received selection of one of the images or videos in the first set of images or videos and based at least in part on the received selection of one of the images or videos in the second set of images or videos. Determining at least one food preparation parameter may include determining at least one of a cooking time or a cooking temperature for the egg. Causing at least one of a second set of images or videos to be displayed by the communications device may include causing at least one of a second set of images or videos to be displayed by the communications device based at least in part on the received selection of one of the images or videos in the first set of images or videos.

The method may further include subsequent to determining at least one food preparation parameter for the food product, causing at least one supplemental prompt to be displayed by the communications device; receiving, via the communications device, a response to the at least one supplemental prompt; and determining at least one food preparation parameter for the food product based at least in part on the received response to the supplemental prompt. Causing at least one supplemental prompt to be displayed by the communications device may include causing at least one supplemental prompt to be displayed by the communications device, the at least one supplemental prompt relating to at least one of a physical characteristic of the food product, an environmental condition, or a food preparation condition. Causing at least one supplemental prompt to be displayed by the communications device may include causing at least one supplemental prompt to be displayed by the communications device, the at least one supplemental prompt relating to at least one of a size of the food product, a shape of the food product, a class of the food product, a temperature of the food product, an altitude, a geographic location or a cooking method. Determining at least one food preparation parameter for the food product may include determining a time and a duration for cooking the food product in a water bath. Causing at least one of a first set of at least two graphical prompts to be displayed by the communications device may include causing at least one of a first set of images or images or videos to be displayed by the communications device.

A processor-based food preparation guidance system may be summarized as including at least one processor; and at least one nontransitory processor-readable medium, communicatively coupled to the at least one processor and which stores at least one of processor-executable instructions or data, wherein in use the at least one processor: receives a request for preparation guidance for a food product; in response to the received request, causes at least one of a first set of at least two graphical prompts to be displayed by a display of a communications device, each of the graphical prompts in the first set of at least two graphical prompts depicting a respective gradation of at least one first characteristic of the food product, the respective gradations being different from one another; receives a selection of one of the gradations of the at least one first characteristic of the food product; and determines at least one food preparation parameter for the food product based at least in part on the received selection of one of the gradations of the at least one first characteristic of the food product. The at least one processor may cause the at least one food preparation parameter to be displayed by the display of the communications device.

The at least one processor may receive, via the communications device, a selection of one of the gradations over a data network; and may send data comprising the at least one food preparation parameter to the communications device over the data network. Each of the graphical prompts in the first set of at least two graphical prompts may depict respective different textures, consistencies, or doneness for the food product. The at least one processor may receive a selection of one of the gradations from the communications device over a data network. The at least one processor may cause at least one of a first set of videos to be displayed by the communications device. The at least one processor may cause at least one of a second set of at least two graphical prompts to be displayed by the display of the communications device in response to the received selection of one of the gradations of the at least one first characteristic of the food product, each of the graphical prompts in the second set of at least two graphical prompts depicts a respective different gradation of at least one second characteristic of the food product; may receive a selection of one of the gradations of the at least one second characteristic of the food product; and may determine at least one food preparation parameter for the food product based at least in part on the received selection of one of the gradations of the at least one second characteristic of the food product. The at least one processor may causes at least one of a second set of at least two graphical prompts to be displayed by the communications device based at least in part on the received selection of one of the gradations of the at least one first characteristic of the food product. The at least one processor may determine at least one of a cooking temperature or a cooking time for the food product.

The at least one processor may receive a request for preparation guidance for an egg, the egg having a white portion and a yolk portion; may cause at least one of a first set of videos to be displayed by the display of the communications device, each of the videos in the first set of videos depicts a respective different texture, consistency, or doneness of one of the white portion and the yolk portion; may receive a selection of one of the videos in the first set of videos; may cause at least one of a second set of videos to be displayed by the communications device in response to the received selection of one of the videos in the first set of videos, each of the videos in the second set of videos depicts a respective different texture, consistency, or doneness of the other of the white portion and the yolk portion; may receive a selection of one of the videos in the second set of videos; and may determine at least one food preparation parameter for the egg based at least in part on the received selection of one of the videos in the first set of videos and based at least in part on the received selection of one of the videos in the second set of videos.

The at least one processor may determine at least one of a cooking time or a cooking temperature for the egg. The at least one processor may cause at least one of a second set of videos to be displayed by the display of the communications device based at least in part on the received selection of one of the videos in the first set of videos. The at least one processor may cause at least one supplemental prompt to be displayed by the display of the communications device; may receive a response to the at least one supplemental prompt; and may determine at least one food preparation parameter for the food product based at least in part on the received response to the supplemental prompt. The at least one supplemental prompt may relate to at least one of a physical characteristic of the food product, an environmental condition, or a food preparation condition. The at least one supplemental prompt may relate to at least one of a size of the food product, a shape of the food product, a class of the food product, a temperature of the food product, an altitude, a geographic location, or a cooking method. The at least one processor may determine a time and a duration for cooking the food product in a water bath. The at least one processor may cause at least one of a first set of images or videos to be displayed by the communications device.

A method of operation in a processor-based food preparation guidance system may be summarized as including receiving, at the food preparation guidance system via a communications device over a data network, a selection of a gradation of at least one first characteristic of a food product, the selection based at least in part on a prompt output by a display of the communications device, wherein the prompt visually depicts the at least one first characteristic of the food product; identifying at least one food preparation parameter for the food product based at least in part on the received selection of the gradation of the at least one first characteristic of the food product; and sending the at least one food preparation parameter to the communications device over the data network.

Identifying at least one food preparation parameter for the food product may include identifying at least one food preparation parameter for the food product utilizing at least one of: a simulation, a model, a lookup table, or an analytical or numerically solvable equation.

A processor-based food preparation guidance system may be summarized as including at least one processor; and at least one nontransitory processor-readable medium, communicatively coupled to the at least one processor and which stores at least one of processor-executable instructions or data, wherein in use the at least one processor: receives, via a communications device over a data network, a selection of a gradation of at least one first characteristic of a food product, the selection based at least in part on a prompt output by the communications device, wherein the prompt visually or audibly depicts the at least one first characteristic of the food product; identifies at least one food preparation parameter for the food product based at least in part on the received selection of the gradation of the at least one first characteristic of the food product; and sends the at least one food preparation parameter to the communications device over the data network.

A method of operation in a processor-based communications device may be summarized as including displaying at least one of a first set of at least two graphical prompts by a display of the communications device, each of the graphical prompts in the first set of at least two graphical prompts depicting a respective gradation of at least one first characteristic of a food product, the respective gradations being different from one another; receiving, via the communications device, a selection of one of the gradations of the at least one first characteristic of the food product; sending data indicative of the received selection of one of the gradations to a processor-based food preparation guidance system over a data network; receiving an output food preparation parameter from the food preparation guidance system over the data network; and displaying the received output parameter by the display of the communications device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with communications devices (e.g., smartphones, personal computers, tablet computers, personal digital assistants), server computers, and/or communications networks have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Figure 1:
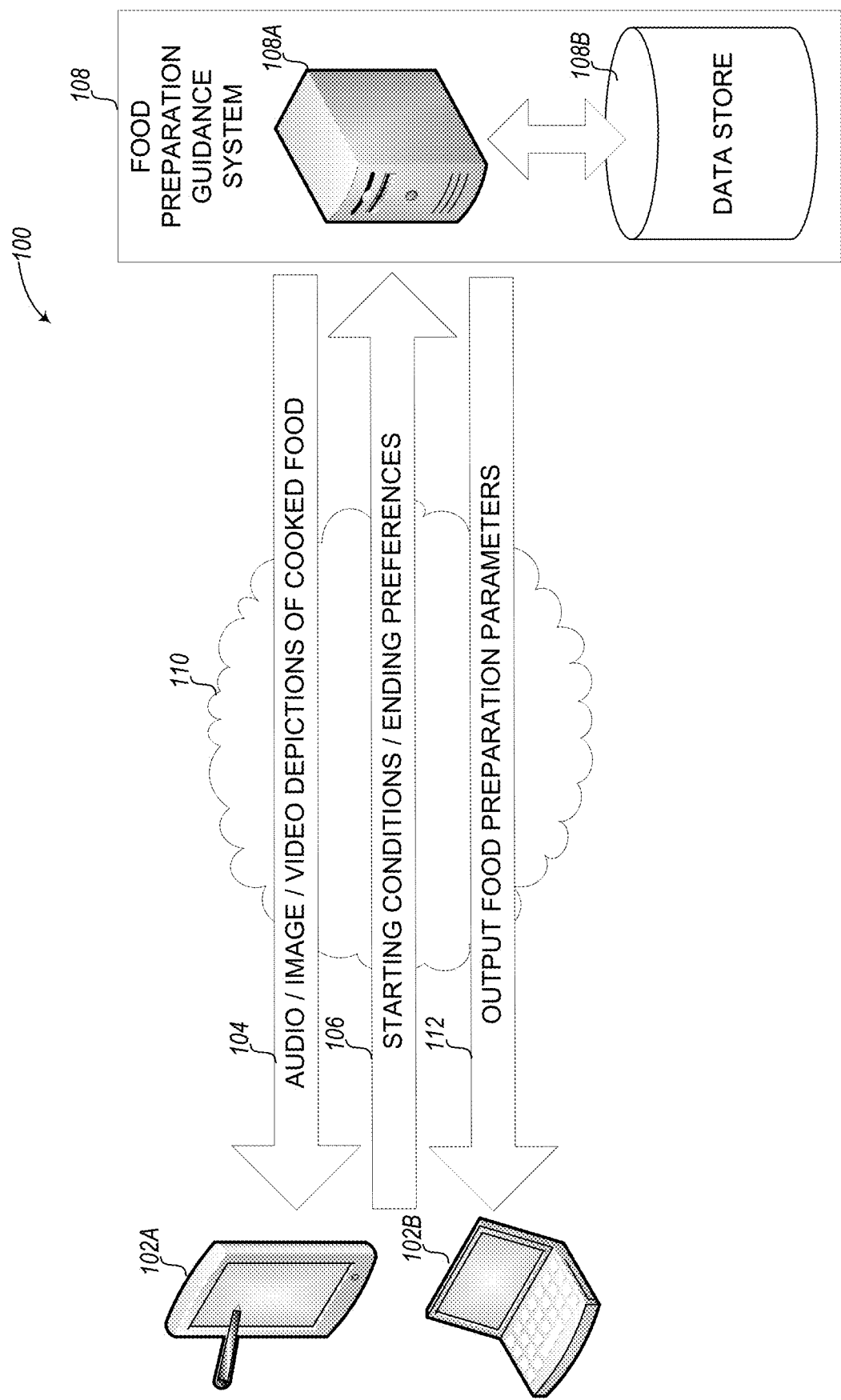
FIG. 1 is a schematic view of an environment in which a food preparation guidance system may be implemented, according to at least one illustrated embodiment.

FIG. 1 shows a networked environment 100 for use in providing customized food preparation instruction or guidance to users, according to at least one illustrated embodiment. As illustrated in FIG. 1, a user or customer uses a client computing device 102A or 102B (generally, client computing devices 102) to experience (e.g., view, listen) one or more audio/image/video ("media") depictions 104 of a prepared food product. The one or more media depictions may present audio or visual depictions of the prepared food product at various gradations or variants of an ending characteristic, such as texture, consistency or doneness. The media depictions allow the user to simply select a preferred gradation for one or more characteristics of a cooked food product, such as the texture or consistency of an egg yolk, the texture or consistency of an egg white, or the texture or consistency of a steak based on visual image or pictorial representations of the food product at a variety of different gradations. The user may utilize the client computing device 102 to send one or more input parameters 106 such as ending preferences or starting conditions to a food preparation guidance (FPG) system 108 via one or more communications channels, for instance communications networks 110 (e.g., LAN, WAN, Internet, Worldwide Web, cellular network). In response, the FPG system 108 sends output food preparation parameters or output cooking parameters 112 (e.g., time, temperature, pressure, speed, etc.) to the client computing device 102 over communications networks 110. The user may the view the output cooking parameters 112 on a display of the computing device 102 and subsequently prepare the food product using a cooking device (e.g., oven, water bath, etc.) according to the received food preparation parameters. Optionally, the FPG system 108 or client computing device 102 may send signals directly to one or more appliances (e.g., sous vide cooker, oven) to autonomously control the appliance. Although the term "cooking" is used herein, it should be appreciated that the present implementations may also be applied to food preparation that does not necessarily require heat, such as preparing a puree, ice cream, smoothie, dough, or other food products.

The computing devices 102 may take any of a large variety of forms. For example, the computing devices 102 may take the form of wired or wireless communications devices, for instance smartphones, tablet computers, personal digital assistants, desktop computers, netbooks, and laptop computers. Optionally, the computing devices 102 include at least one image capture device, for instance a camera with suitable optics and, optionally a flash or illumination source. The computing devices 102 also typically include one or more transmitters, receivers, and transceivers, collectively denominated herein as radios, which provide wireless communications from the computing devices. The radios may communicative at any of a variety of frequencies and employing any of a variety of communications protocols, for instance frequencies and protocols used for cellular communications (e.g., CDMA, TDMA, Edge, G3, G4, LTE, GSM) or wireless local area networks (e.g., WIFI®, IEEE 802.11, WiMAX, IEEE 802.16, VoIP), or wireless peer-to-peer communications (e.g., Bluetooth®). The computing devices 102 may also include one or more wired communication interfaces that utilize parallel cables, serial cables, or wireless channels capable of high speed communications, for instance, via one or more of FireWire®, Universal Serial Bus® (USB), Thunderbolt®, or Gigabyte Ethernet®.

The FPG system 108 may take the form of one or more server computer systems 108A with associated nontransitory processor-readable storage media or data store 108B. While illustrated as a single server computer system 108A and associated nontransitory storage media 108B, many implementations may employ two or more server computer system 108A and/or nontransitory associated processor- or computer-readable storage media 108B. In some implementations or instances, the nontransitory processor- or computer-readable media 108B may include a database or other data structure which stores one or more of: image data, video data, audio data, cooking simulation models, lookup tables, food preparation algorithms, customer identifiers, customer account identifiers, customer identity information, financial account information (e.g., credit and/or debit account numbers, expiration dates, security codes), and/or other data or statistics.

While generally described below in terms of a user interface generated via instructions executing on a computing device, in some implementations the FPG system 108 may serve as a user portal that may operate, for example, as a Web server, serving HTML pages or providing Web services which function as the user interface. Thus, in some implementations, the FPG system 108 serves as a user portal, providing a user interface, for instance a Web based interface, which allows users access functionality disclosed herein via various processor-based computing devices 102.

A user interface displayed on the display of the computing devices 102 may include various pull-down menus, tabs, user selectable icons, input fields, scroll bars, images, videos, audio, and dialog boxes, as well as other user interface components. The user interface may allow a user or customer to create a user or customer account using the computing device 102. The user or customer may enter their full name, screen name or nickname, address, and/or date of birth. The user or customer may optionally enter financial account information, for instance an account number, expiration date, and validation or security code associated with a charge or debit account. This allows automated charging or debiting on purchase of items, goods or services by the user or customer.

The various systems, subsystems, and/or processor-based devices are capable of communications, for example via the one or more networks 110 which may be, for instance, packet switched communications networks, such as the Internet, Worldwide Web portion of the Internet, extranets, intranets, and/or various other types of telecommunications networks such as cellular phone and data networks, and plain old telephone system (POTS) networks. The type of communications infrastructure should not be considered limiting. The communications networks 110 may take any of a large variety of forms, and may include modems (e.g., DSL modem, cable modem), routers, network switches, and/or bridges, etc.

While often illustrated as a single nontransitory processor-readable storage medium, in many implementations each of the various illustrated nontransitory computer- or processor-readable storage media may constitute a plurality of nontransitory storage media. The plurality of nontransitory storage media may be commonly located at a common location, or distributed at a variety of remote locations. Database(s) may be stored separately from one another on separate computer- or processor-readable storage medium or may be stored on the same computer- or processor-readable storage medium as one another. Various computer- or processor-readable storage medium may be co-located with the corresponding computer systems, for example, in the same room, building or facility. Alternatively, various computer- or processor-readable storage medium may be located remotely from the corresponding computer systems (e.g., server computer systems) for example, in a different facility, city, state or country. Electronic or digital information, files or records or other collections of information may be stored at specific locations in non-transitory computer- or processor-readable media, thus are logically addressable portions of such media, which may or may not be contiguous.

While FIG. 1 illustrates a representative networked environment 100, typical networked environments may include many additional computer systems and entities. The concepts taught herein may be employed in a similar fashion with more populated networked environments than that illustrated in FIG. 1. For example, there are likely hundreds, if not thousands or even millions of users or customers and computing devices 102. There may be more than one FPG system 108, for example located in different countries or regions within a country. Further, some or all of the FPG system 108 may be implemented within the computing devices 102 themselves.

Figure 2:
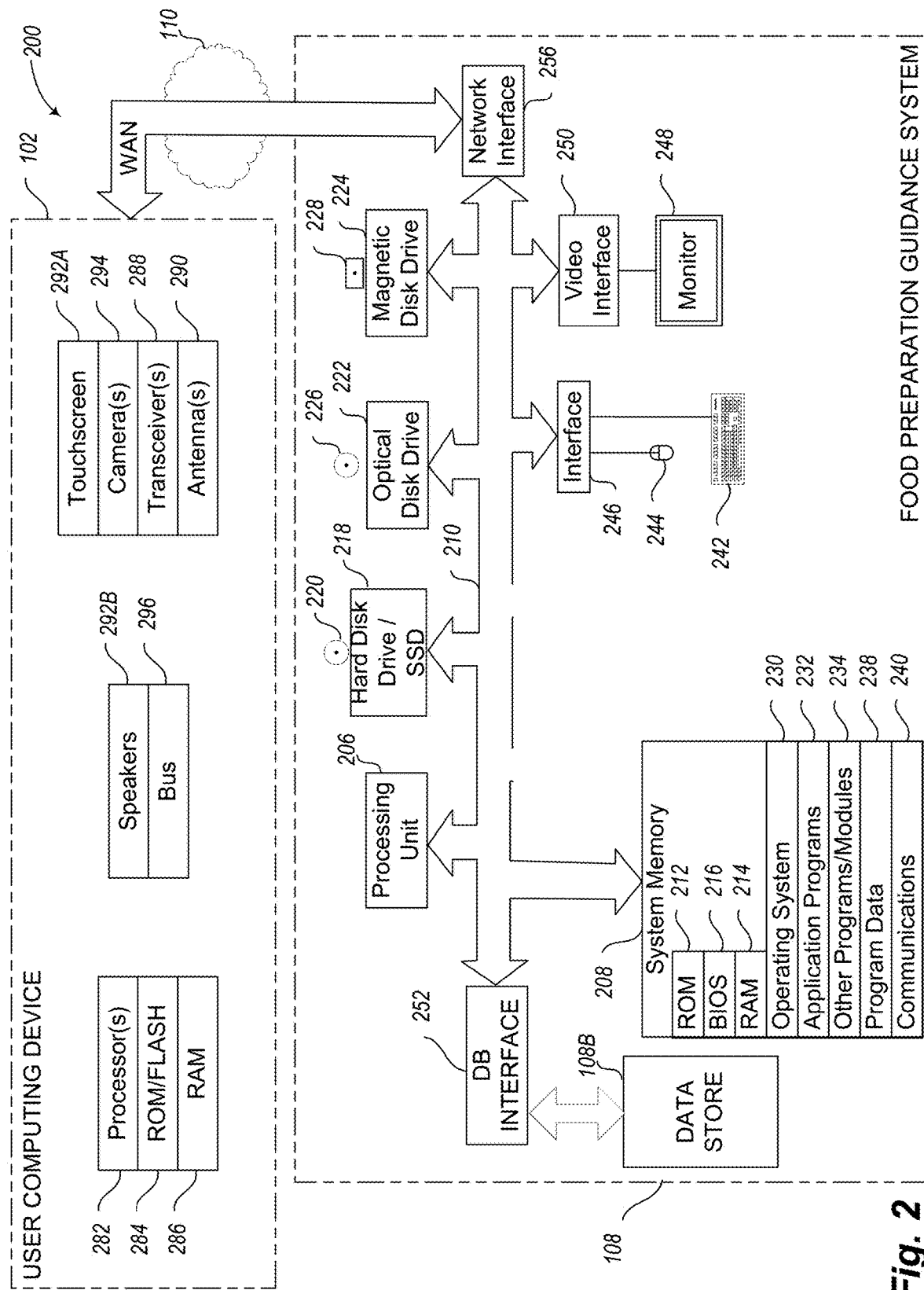
FIG. 2 is a functional block diagram of portions of the food preparation guidance system of FIG. 1, according to at least one illustrated embodiment.

FIG. 2 and the following discussion provide a brief, general description of the components forming an exemplary networked environment 100 including the FPG system 108 and computing devices 102 (only one shown) in which the various illustrated embodiments can be implemented. The networked environment 100 may, for example, implement the various functions and operations discussed immediately above in reference to FIG. 1. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The FPG system 108 may take the form of a conventional PC, server, or other computing system executing logic or other machine executable instructions. The FPG system 108 includes one or more processors 206, a system memory 208 and a system bus 210 that couples various system components including the system memory 208 to the processor 206. The FPG system 108 will at times be referred to in the singular herein, but this is not intended to limit the embodiments to a single system, since in certain embodiments, there will be more than one FPG system 108 or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 206 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the FPG system 108, such as during start-up. Some embodiments may employ separate buses for data, instructions and power.

The FPG system 108 also may include a hard disk drive 218 for reading from and writing to a hard disk 220, and an optical disk drive 222 and a magnetic disk drive 224 for reading from and writing to removable optical disks 226 and magnetic disks 228, respectively. The optical disk 226 can be a CD or a DVD, while the magnetic disk 228 can be a magnetic floppy disk or diskette. The hard disk drive 218, optical disk drive 222 and magnetic disk drive 224 communicate with the processor 206 via the system bus 210. The hard disk drive 218, optical disk drive 222 and magnetic disk drive 224 may include interfaces or controllers (not shown) coupled between such drives and the system bus 210, as is known by those skilled in the relevant art. The drives 218, 222, 224, and their associated computer-readable media 220, 226, 228, respectively, provide nonvolatile storage of computer-readable instructions, data structures, program modules and other data for the FPG system 108. Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 208, such as an operating system 230, one or more application programs 232, other programs or modules 234, and program data 238.

The application program(s) 232 may include logic capable of providing customized food preparation guidance or instructions to a user via the user computing device 102. For example, where the user or customer selects one or more starting conditions and/or ending preferences, the FPG system 108 determine one or more output food preparation parameters based on the starting conditions or ending preferences. For example, the one or more starting conditions may relate to food type, food size, food weight, starting temperature, altitude, geographic location, or the like. Ending preferences may include temperature, texture, "doneness," taste, or the like. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 2 may be communicably coupled to the processor 282 to provide additional functionality such as geolocation data and three-dimensional position data to the processor 282. For example, in some regions or countries, terms may have different meanings (e.g., the meaning of "medium rare" may vary across geographic locations). The processor may receive geographic location information automatically (e.g., via GPS) or manually (e.g., via user input) and account for differences in terminology due to geographic location.

The output food preparation parameters may include cooking time, cooking temperature, cooking pressure, mixing speed, or other food preparation parameters. The application program(s) 232 may, for example, be stored within the system memory 208 as one or more sets of logic or one or more sets of machine executable instructions.

The system memory 208 may include communications programs 240 that permit the FPG system 108 to access and exchange data with other networked systems or components, such as other computing devices 102, an external computer system, or the like.

While shown in FIG. 2 as being stored in the system memory 208, the operating system 230, application programs 232, other programs/modules 234, program data 238 and communications 240 can be stored on the hard disk 220 of the hard disk drive 218, the optical disk 226 of the optical disk drive 222 and/or the magnetic disk 228 of the magnetic disk drive 224.

Authorized personnel can enter commands (e.g., system maintenance, upgrades, etc.) and information (e.g., cooking simulation parameters, equations, models, etc.) into the FPG system 108 using one or more communicably coupled input devices such as a touch screen or keyboard 242, a pointing device such as a mouse 244, and/or a push button (not shown). Other input devices can include a microphone, joystick, game pad, tablet, scanner, biometric scanning device, etc. These and other input devices are connected to the processing unit 206 through an interface 246 such as a universal serial bus ("USB") interface that couples to the system bus 210, although other interfaces such as a parallel port, a game port or a wireless interface or a serial port may be used. A monitor 248 or other display device is coupled to the system bus 210 via a video interface 250, such as a video adapter. In at least some instances, the input devices may be located proximate the FPG system 108, for example when the system is installed at the system user's premises. In other instances, the input devices may be located remote from the FPG system 108, for example when the system is installed on the premises of a service provider.

In some implementations, the FPG system 108 operates in an environment 100 (FIG. 1) using one or more of the logical connections to optionally communicate with one or more remote computers, servers and/or other devices via one or more communications channels, for example, one or more networks 110. These logical connections may facilitate any known method of permitting computers to communicate, such as through one or more LANs and/or WANs. Such networking environments are well known in wired and wireless enterprise-wide computer networks, intranets, extranets, and the Internet.

In some implementations, a network port or interface 256, communicatively linked to the system bus 210, may be used for establishing and maintaining communications over the communications network 110. Further, a data store interface 252, which is communicatively linked to the system bus 210, may be used for establishing communications with the nontransitory processor-readable storage medium or data store 108B, which may a part of the FPG system 108 or at least in operative communication therewith. For example, the data store 108B may include a repository for storing information regarding cooking simulation parameters, cooking simulation models, media files depicting ending gradations or preferences for food products (e.g., images or videos depicting texture and/or consistency of an egg yolk, textures and/or consistency of an egg white, images depicting exterior of a steak, images depicting an interior of a steak), end user account information (e.g., user cooking devices and parameters therefor, user preferences, etc.), end user computing device information, system user specific information relevant to providing one or more customized food preparation instructions to the end user, or combinations thereof. In some embodiments, the database interface 252 may communicate with the data store 108B via the networks 110.

In the networked environment 100 (FIG. 1), program modules, application programs, or data, or portions thereof, can be stored in another server computing system (not shown). Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

For convenience, the processor 206, system memory 208, network port 256 and interfaces 246, 252 are illustrated as communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

The computing device 102 can include any device, system or combination of systems and devices having at least wired or wireless communications capabilities. In most instances, the computing device 102 includes additional devices, systems, or combinations of systems and devices capable of providing graphical data display capabilities. Examples of such computing devices 102 can include without limitation, cellular telephones, smart phones, tablet computers, desktop computers, laptop computers, ultraportable or netbook computers, personal digital assistants, handheld devices, and the like.

The computing device 102 may include one or more processors 282 and nontransitory computer- or processor-readable media, for instance one or more nonvolatile memories such as read only memory (ROM) or FLASH memory 284 and/or one or more volatile memories such as random access memory (RAM) 286.

The computing device 102 may include one or more transceivers or radios 288 and associated antennas 290. For example, the computing device 102 may include one or more cellular transceivers or radios, one or more WIFI® transceivers or radios, and one or more BLUETOOTH® transceivers or radios, along with associated antennas. The computing device 102 may further include one or more wired interfaces (not shown) that utilize parallel cables, serial cables, or wireless channels capable of high speed communications, for instance, via one or more of Fire-Wire®, Universal Serial Bus® (USB), Thunderbolt®, or Gigabyte Ethernet®, for example.

The computing device 102 may include a user input/output subsystem, for example including a touchscreen or touch sensitive display device 292A and one or more speakers 292B. The touchscreen or touch sensitive display device 292A can include any type of touchscreen including, but not limited to, a resistive touchscreen or a capacitive touchscreen. The touchscreen or touch sensitive display device 292A may present a graphical user interface, for example in the form of a number of distinct screens or windows, which include prompts and/or fields for selection. The touchscreen or touch sensitive display device 292A may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example an alphanumeric keypad, a QWERTY keyboard, a joystick, scroll wheel, touchpad or similar physical or virtual input device.

The computing device 102 may include one or more image capture devices 294, for example, cameras with suitable lenses, and optionally one or more flash or lights for illuminating a field of view to capture images. The camera(s) 294 may capture still digital images or moving or video digital images. Image information may be stored as files via the flash memory 284.

Some or all of the components within the computing device 102 may be communicably coupled using at least one bus 296 or similar structure adapted to transferring, transporting, or conveying data between the devices, systems, or components used within the computing device 102. The bus 296 can include one or more serial communications links or a parallel communications link such as an 8-bit, 16-bit, 32-bit, or 64-bit data bus. In some embodiments, a redundant bus (not shown) may be present to provide failover capability in the event of a failure or disruption of the primary bus 296.

The processor(s) 282 may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 282, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 282 upon initial application of power. The processor(s) 282 may also execute one or more sets of logic or one or more machine executable instruction sets loaded from the RAM 286 subsequent to the initial application of power to the processor 282. The processor 282 may also include a system clock, a calendar, or similar time measurement devices. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 2 may be communicably coupled to the processor 282 to provide additional functionality such as geolocation data and three-dimensional position data to the processor 282.

The transceivers or radios 288 can include any device capable of transmitting and receiving communications via electromagnetic energy.

Non-limiting examples of cellular communications transceivers or radios 288 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios 288 can include more than one interface. For example, in some instances, the cellular transceivers or radios 288 can include at least one dedicated, full- or half-duplex, voice call interface and at least one dedicated data interface. In other instances, the cellular transceivers or radios 288 can include at least one integrated interface capable of contemporaneously accommodating both full- or half-duplex voice calls and data transfer.

Non-limiting examples of WiFi® transceivers or radios 288 include various chipsets available from Broadcom, including BCM43142, BCM4313, BCM94312MC, BCM4312, and chipsets available from Atmel, Marvell, or Redpine. Non-limiting examples of Bluetooth® transceivers or radios 288 include various chipsets available from Nordic Semiconductor, Texas Instruments, Cambridge Silicon Radio, Broadcom, and EM Microelectronic.

As noted, nontransitory computer- or processor-readable medium can include non-volatile storage memory and in some embodiments may include a volatile memory as well. At least a portion of the memory is used to store one or more processor executable instruction sets for execution by the processor 282. In some embodiments, all or a portion of the memory may be disposed within the processor 282, for example in the form of a cache. In some embodiments, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing applications or "apps" executable by the processor 282 may be stored in whole or in part in at least a portion of the memory 284, 286. In at least some instances, the applications may be downloaded or otherwise acquired by the end user, for example using an online marketplace such as the Apple App Store, Amazon Marketplace, or Google Play marketplaces. In some implementations, such applications may start up in response to selection of a corresponding user selectable icon by the user or consumer. The application can facilitate establishing a data link between the computing device 102 and the FPG system 108 via the transceivers or radios 288 and communication networks 110.

As discussed in more detail below, the application(s) may include logic or instructions to provide the end user with access to a number of graphical screens or windows with prompts, fields, and other user interface structures that allow the user or consumer to obtain food preparation instructions or guidance via the FPG system 108. Such may include, for example, logic or machine executable instructions for various screens or windows, examples of which are generally illustrated in FIGS. 4A-4I, and discussed below.

Figure 3:
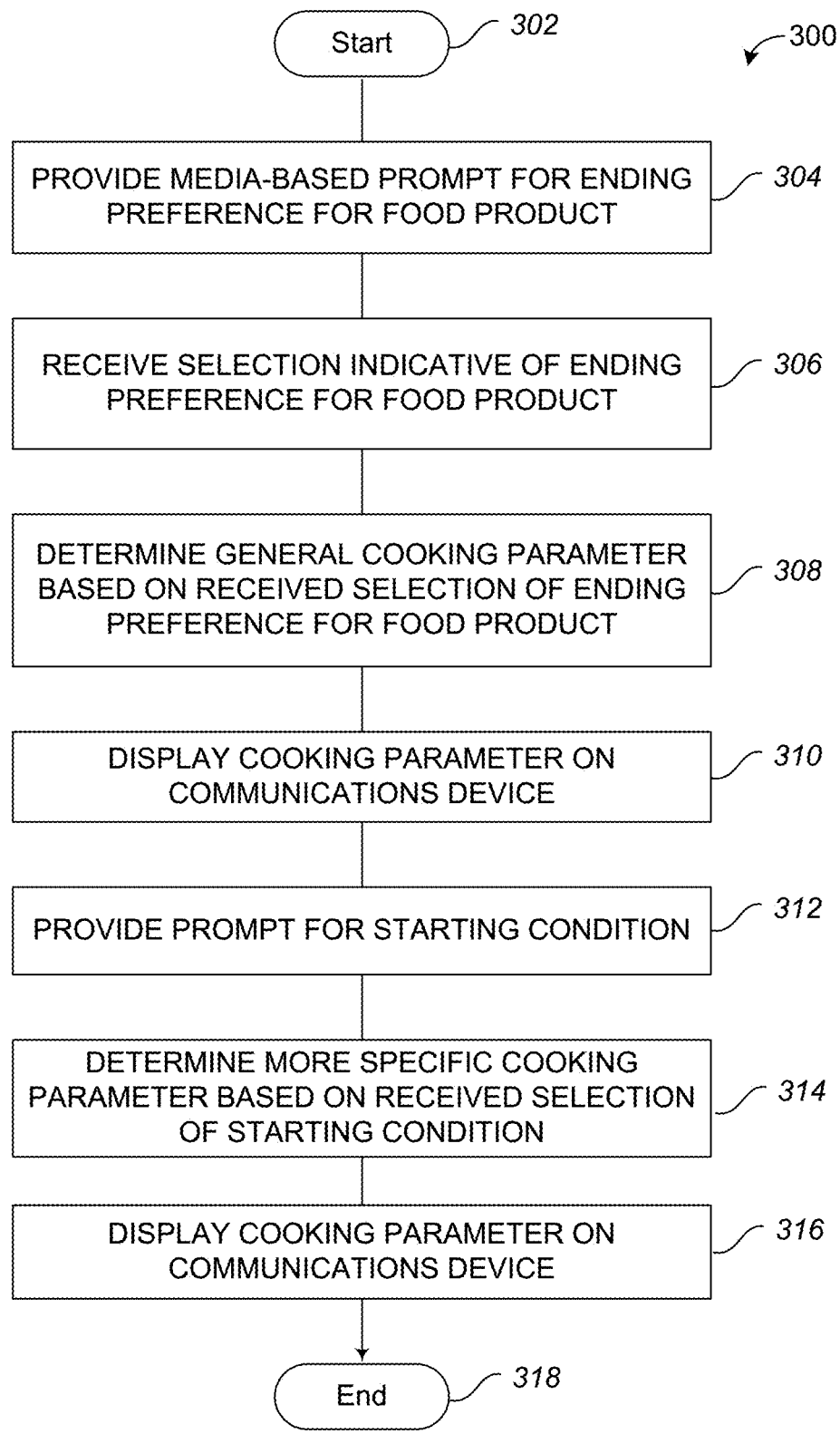
FIG. 3 is a flow diagram showing a method of operation of a processor-based device in a food preparation guidance system, according to at least one illustrated embodiment.

FIG. 3 shows a method 300 of operating a processor-based device to provide food preparation instruction to a user in a food preparation guidance (FPG) system, according to one illustrated embodiment. FIGS. 4A-4I show various exemplary screen prints or windows which may be displayed as part of executing the method 300 for an FPG system that provides instructions for cooking an egg in a temperature controlled water bath (i.e., sous vide cooking process). Sous vide is a method of cooking food in a water bath or in a temperature-controlled steam environment for longer than normal cooking times at an accurately regulated temperature much lower than normally used for conventional cooking. In some instances, the food is sealed (e.g., watertight, airtight) in plastic bags. Sous vide cooking techniques typically employ temperatures around 55° C. to 80° C. for meats and higher for vegetables. The intention is to cook the item evenly, ensuring that the inside is properly cooked without overcooking the outside, and retain moisture. FIGS. 4A-4I are discussed in the context of the method 300 to enhance understanding.

Notably, the approach described herein provides users with media-based prompts (e.g., visual and/or audible prompts) depicting two or more choices for ending preferences for a food product that allow the user to easily select a desired ending preference for a cooked food product, and to receive precise cooking instructions for cooking the food product to achieve the selected desired ending preferences or characteristics. Such ending preferences or characteristics may relate to texture, consistency, doneness, crispness, and the like.

The method 300 starts at 302. For example, the method 300 may start in response to an opening of a specific application or selection of an icon displayed on a display of a computing device. In response, the processor-based display may cause a display or presentation of a splash screen or introduction screen, for instance, an introduction screen 400A illustrated in FIG. 4A.

At 304, the processor-based device may provide a media-based prompt for an ending preference or characteristic for a food product to be selected, for instance, via a display of the computing device. For example, the processor-based device may display or cause to be displayed an egg white texture prompt screen 402, identical or similar to that illustrated in FIG. 4B. The illustrated egg white texture prompt screen 402 includes a slider bar 404 or set of scroll icons selection of which causes incremental stepped movement either forward through a set of at least two graphical prompts 406 or backward through the set of at least two graphical prompts. Other user interface elements may be employed, including those commonly associated with touchscreen interfaces allowing multi-finger input, tapping, and swiping.

In the illustrated embodiment, the set of at least two graphical prompts 406 include a plurality of videos (or animated images) each depicting a different texture of an egg white. For example, as the user scrolls from left to right using the slide bar 404, videos depicting egg whites having different gradations of texture or consistency from very runny to very firm are displayed on the display of the computing device. Each video in the set of videos may be accompanied with textual description 408 and/or an audio description. The audio description may be a narrative description and/or may include a sound which is made when the food product is cut, sliced, cracked, or placed on a dish or pan. In some embodiments, each video has a relatively short duration (e.g., 2 seconds, 5 seconds, 10 seconds, etc.), and shows the food product (e.g., an egg) during an action, such as being placed onto a plate or being cut. Users watching one of the videos may observe the movement of the food product (e.g., an egg) as it is placed on the plate or as the food product is cut to help the user determine whether the texture or consistency of the food product shown in a particular one of the videos, pictures or images is preferred.

In some implementations, the set of at least two graphical prompts 406 includes a set of still images in addition to or instead of a set of videos. In some implementations, each video or image may also include audio which may allow the user to observe additional information about a characteristic of the cooked food product (e.g., crispness, crunch, etc.). In some embodiments, a set of audio clips without visual prompts is provided.

Figure 4A:
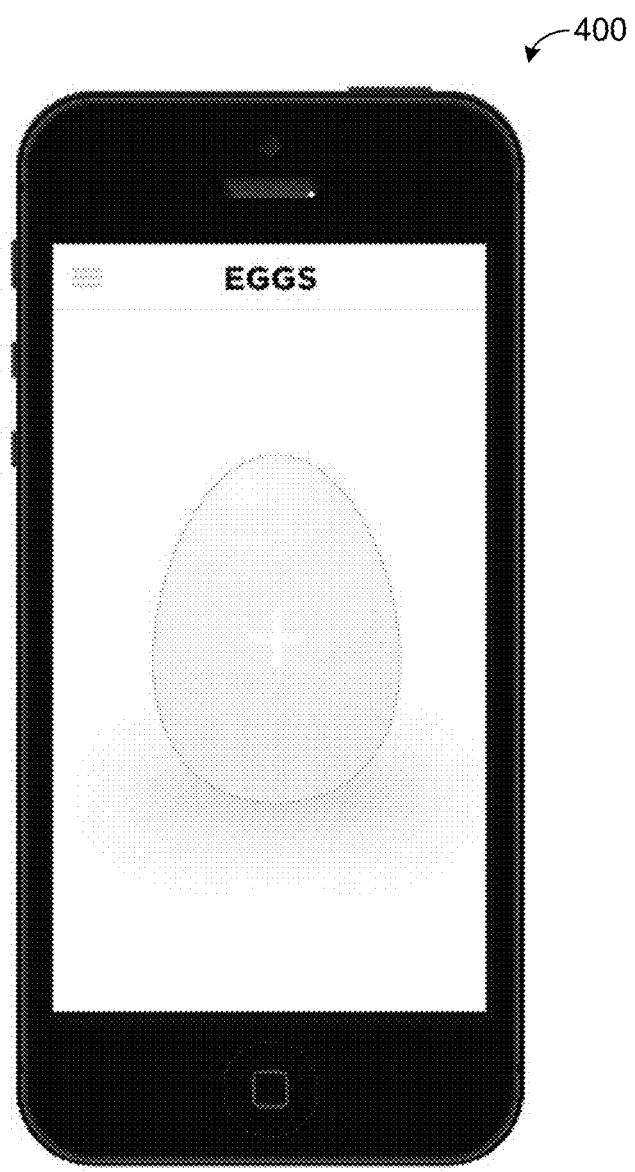
FIGS. 4A-4I are screen prints of a plurality of screens or windows of a graphical user interface (GUI) provided by a processor-based device for use in the food preparation guidance system of FIG. 1, according to at least one illustrated embodiment.
Figure 4B:
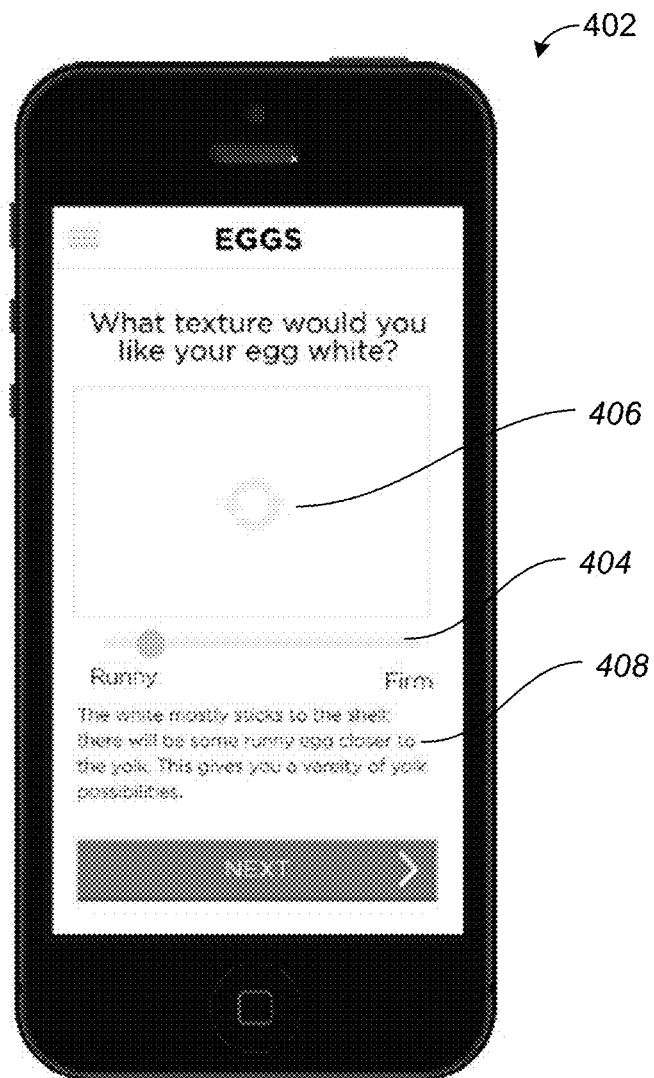
Figure 4C:
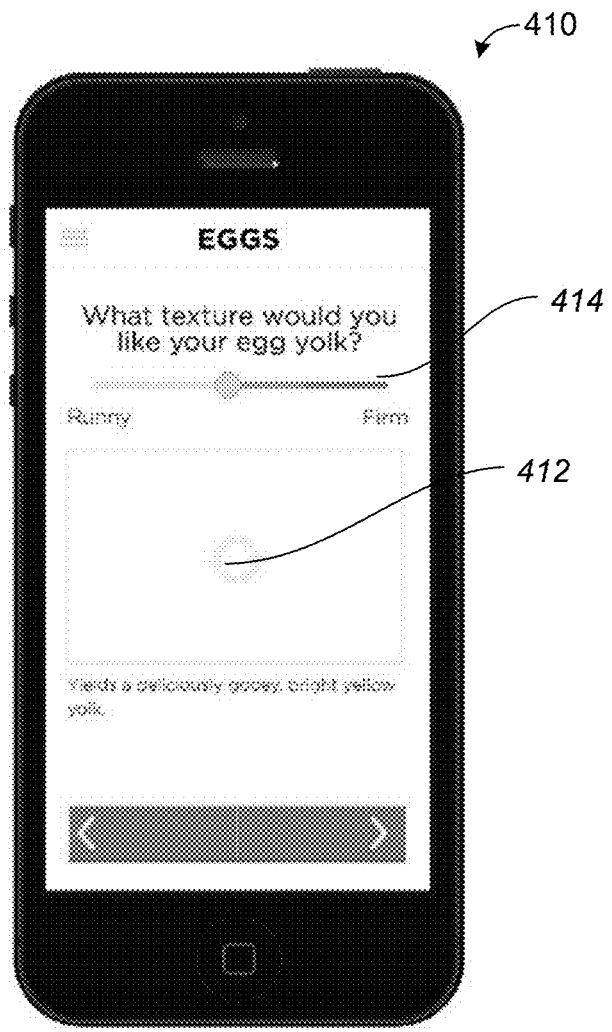

As shown in FIG. 4C, the processor-based device may display or caused to be displayed an egg yolk texture prompt screen 410, which includes a set of at least two graphical prompts 412 depicting a second characteristic, namely egg yolk texture. Similar to the egg white texture prompt screen 402 discussed above, the egg yolk texture prompt screen 410 may also include a set of at least two graphical prompts 412 including videos and/or images that may be scrolled through using a slide bar 414 or other interface element. The graphical prompts 412 may allow the user to visualize different textures of an egg yolk, spanning between very runny and very firm.

In some implementations, the set of at least two graphical prompts 412 provided to the user on the egg yolk texture prompt screen 410 is dependent on the ending preference selected by the user in the egg white texture prompt screen 402 (FIG. 4B). For example, if a user selects a "very runny" egg white texture, only egg yolk textures or consistencies that are relatively runny may be presented as options to the user. That is, only a subset of the possible egg yolk textures or consistencies may be presented to the user dependent on the user's selection of an egg white texture. This is because it may not be desirable or possible to cook an egg with a very runny white portion and a very firm yolk portion, or vice versa.

As a non-limiting example, a set of ten videos (or images) may be available that depict an egg white at different gradations from very runny (video 1) to very firm (video 10). Similarly, a set of ten videos (or images) may available that depict an egg yolk at different gradations from very runny (video 1) to very firm (video 10). If a user selects video 1 (very runny) for the egg white texture, only videos 1 to 5 (very runny to medium) for the egg yolk may be available to select by the user, for example. As another example, if a user selects video 5 (medium) for the egg white texture, only videos 3 to 7 for the egg yolk may be available to select by the user. It should be appreciated that these examples are provided for explanatory purposes and should not be viewed as limiting.

At 306, the processor-based device receives a selection indicative of an ending preference for the food product. For example, the processor-based device may detect an input or selection of the slide bar 404 (FIG. 4B) of the egg white texture prompt screen 402 and an input or selection of the slide bar 414 (FIG. 4C) of the egg yolk texture prompt screen 410 via a touchscreen display.

At 308, the processor-based device determines one or more general food preparation parameters based at least in part on the received selection indicative of an ending preference. For example, the processor-based device may perform one or more simulations utilizing the selected ending preferences as inputs to determine a cooking time and a cooking temperature to cook the food product to achieve the selected ending preferences (e.g., texture, consistency, doneness). The processor-based device may determine one or more general food preparation parameters using any suitable methods, such as one or more simulations, modeling, one or more lookup tables, one more analytical or numerically solvable equations, or the like.

At 310, the processor-based device displays or causes to be displayed the determined one or more food preparation parameters on the display of the communications device. As an illustration, the processor-based device may be a server, such as the server 108A of FIG. 1, that sends the determined food preparation parameters to a communications device over a data network.

Figure 4D:
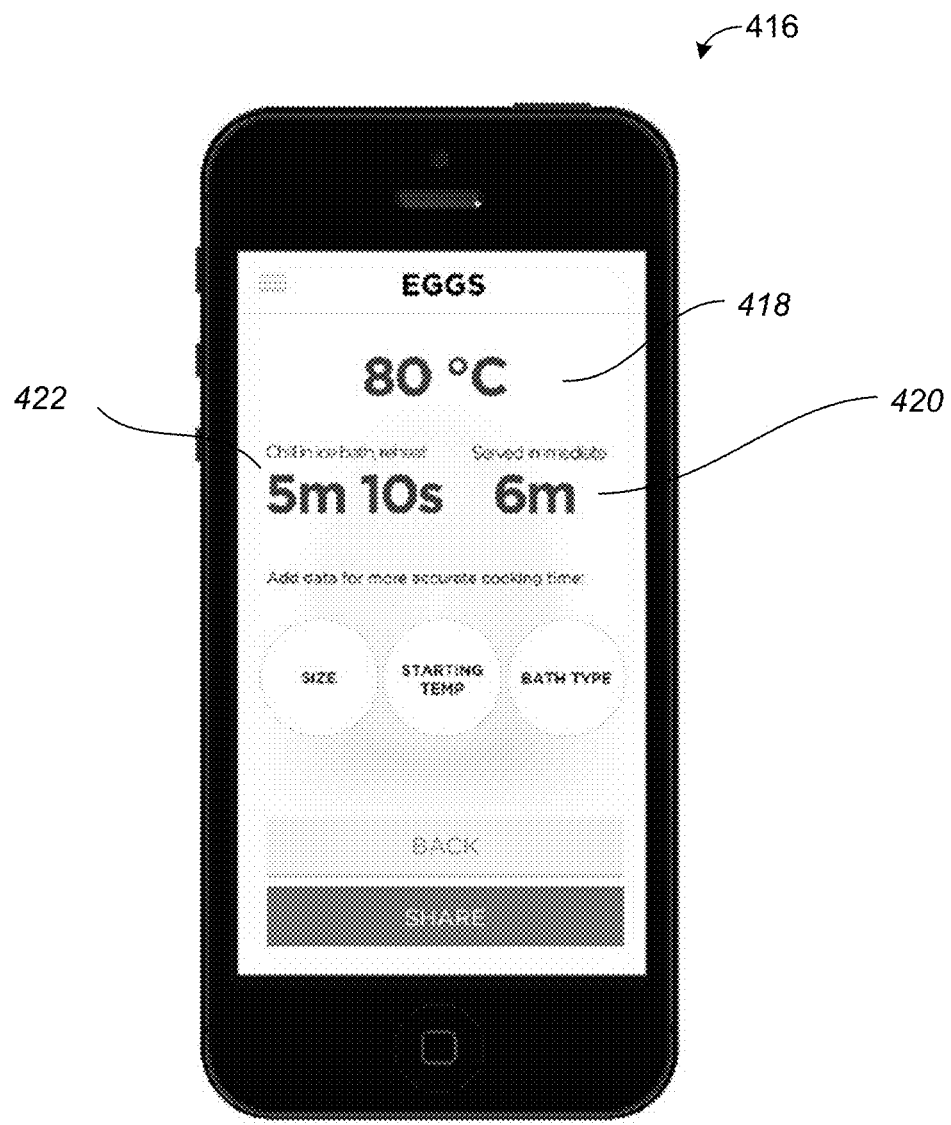

For example, the processor-based device may display or cause to be displayed a cooking instructions results screen 416 identical or similar to that illustrated in FIG. 4D. The cooking instructions results screen 416 includes a cooking temperature 418, a cooking time 420 for a cook-serve process, and a cooking time 422 for a cook-chill process. Cook-serve (or cook-hold) sous vide cooking may include the acts of preparing for packaging, vacuum packaging, heating or pasteurizing, finishing, and serving. Cook-chill (or cook-freeze) sous vide cooking may include the acts of preparing for packaging, vacuum packaging, pasteurizing, rapid chilling (e.g., in an ice bath), refrigerating or freezing, reheating, finishing, and serving. In the illustrated example, the cooking temperature 418 is specified as 80 degrees Celsius, the cook-chill time 422 is five minutes and 10 seconds, and the cook-serve time 420 is six minutes.

At 312, the processor-based device may provide one or more prompts for additional data, referred to herein as starting conditions, to provide more accurate output food preparation parameters. Non-limiting examples of starting conditions include a physical characteristic of the food product (e.g., size, weight, shape, type), an environmental condition (e.g., starting temperature, altitude, geographic location), or a food preparation condition (e.g., type of cooking method, whether a water bath is stirred or unstirred). These parameters may be employed to, for example, refine the previously generated cooking instructions. Alternatively, these parameters may be employed in initially generating the cooking instructions.

Figure 4E:
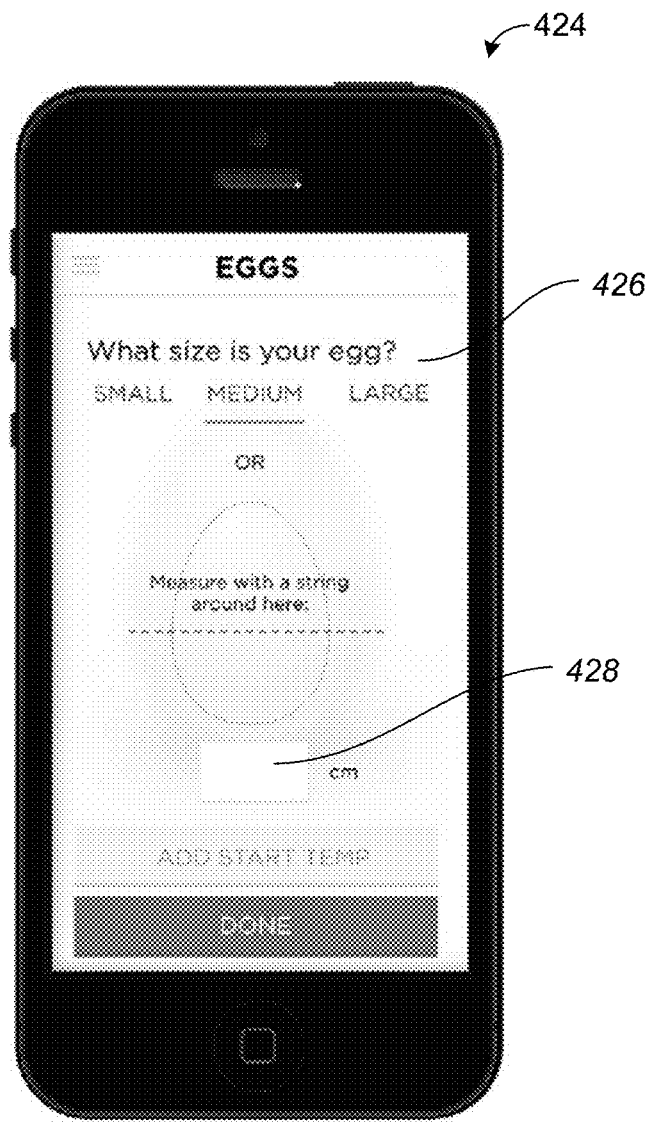
Figure 4F:
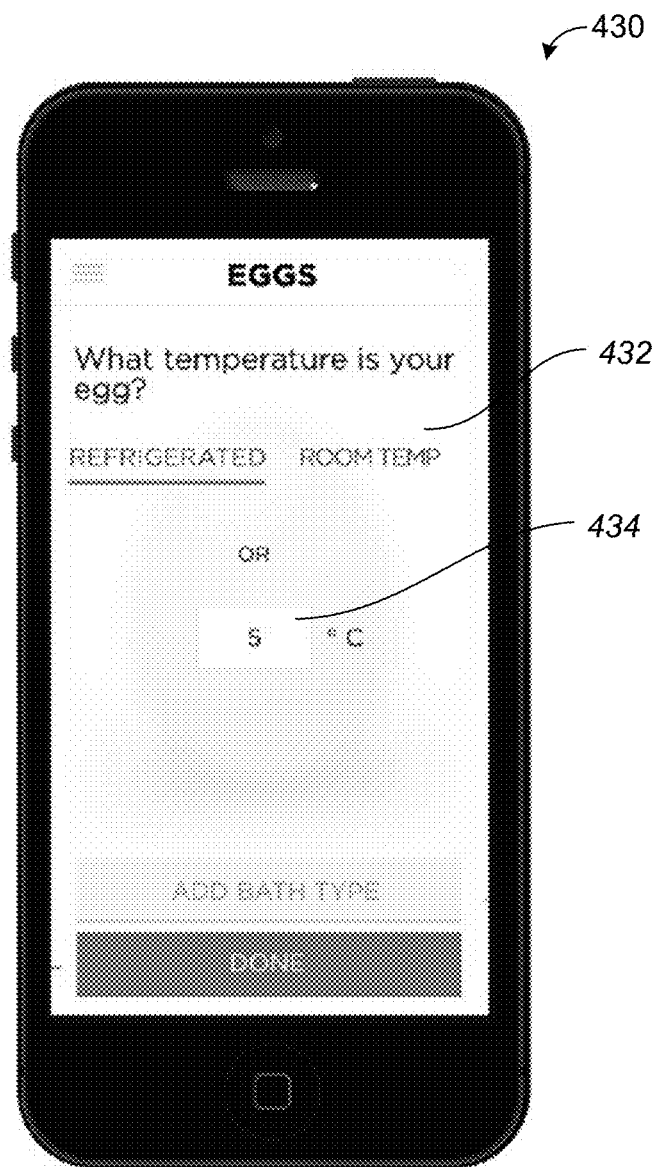
Figure 4G:
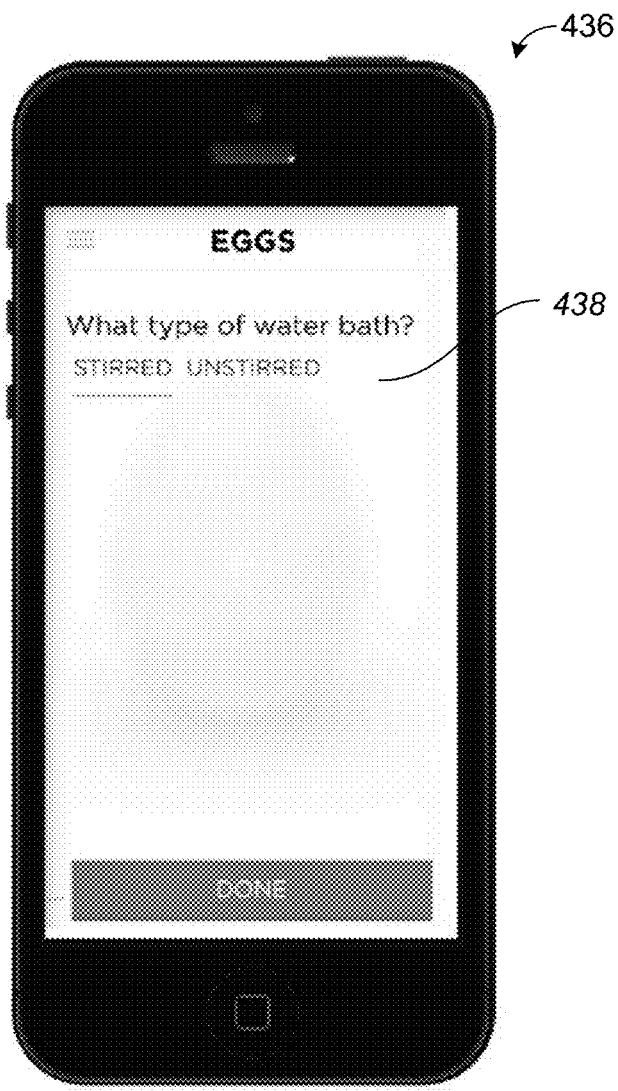

FIGS. 4E-4G illustrate example prompt screens for starting conditions for cooking an egg using the sous vide cooking process. Specifically, FIG. 4E illustrates an egg size prompt screen 424 that includes selection icons 426 that allow the user to select whether the egg to be cooked is small, medium, or large sized. For users that wish to have greater precision, the egg size prompt screen 424 also provides a text box 428 that allows the user to input the circumference of the egg in centimeters.

FIG. 4F illustrate an egg temperature prompt screen 430 that includes selection icons 432 that allow the user to select whether the egg is refrigerated or at room temperature. The user may also input the exact starting temperature of the egg into a text box 434 on the egg temperature prompt screen 430 if more precision is desired.

FIG. 4G illustrates a water bath type prompt screen 436 that includes selection icons 438 that allow the user to select whether the water bath is stirred or unstirred.

At 314, the processor-based device determines more accurate output food preparation parameters based on the additional starting conditions provided by the user. In the illustrated example, the processor-based device may utilize the size of the egg, the starting temperature of the egg, and whether the water bath is stirred or unstirred as inputs into a simulation or model to predict a cooking temperature and cooking time that will provide a cooked egg with the user's selected ending preferences (e.g., egg yolk texture or consistency, egg white texture or consistency).

At 316, the processor-based device displays or causes to be displayed the determined more accurate output food preparation parameters on the display of the communications device, as discussed above. The user may then utilize the provided output food preparation parameters to cook the food product according to the user's selected ending preferences. Optionally, signals may be sent to one or more appliances either directly by a server or via a user operated device, based on one or more of the cooking instructions. The signals may control one or more operational parameters of the appliance (e.g., temperature, time, speed, pressure).

At 318, the processor-based device ends the method 300. The method 300 terminates at 318 until called again. Alternatively, the method 300 may repeat, for example, with control returning to 302. Alternatively, the method 300 may run concurrently with other methods or processes, for example, as one of multiple threads on a multi-threaded processor system.

Figure 4H:
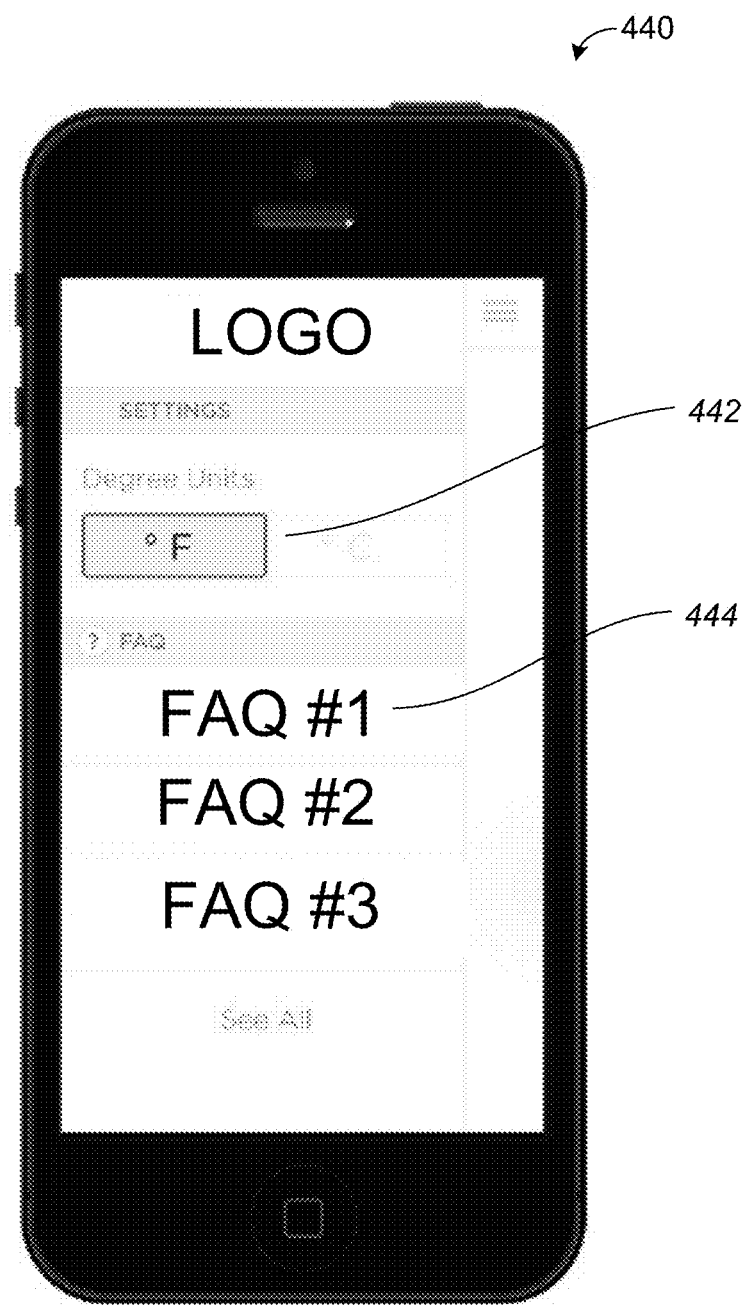

FIG. 4H illustrates a settings screen 440 for an application associated with an FPG system, such as the FPG system 108 of FIG. 1. In this embodiment, the settings screen 440 includes selection icons 442 that allow the user to select between two temperature scales, Fahrenheit and Celsius. The setting screen 440 also includes a list 444 of frequently asked questions (FAQ) and answers that users may read to learn more about the application or to learn more about one or more cooking processes. The settings screen 440 may include more or less settings that allow the user to configure the application according to the user's preferences.

Figure 4I:
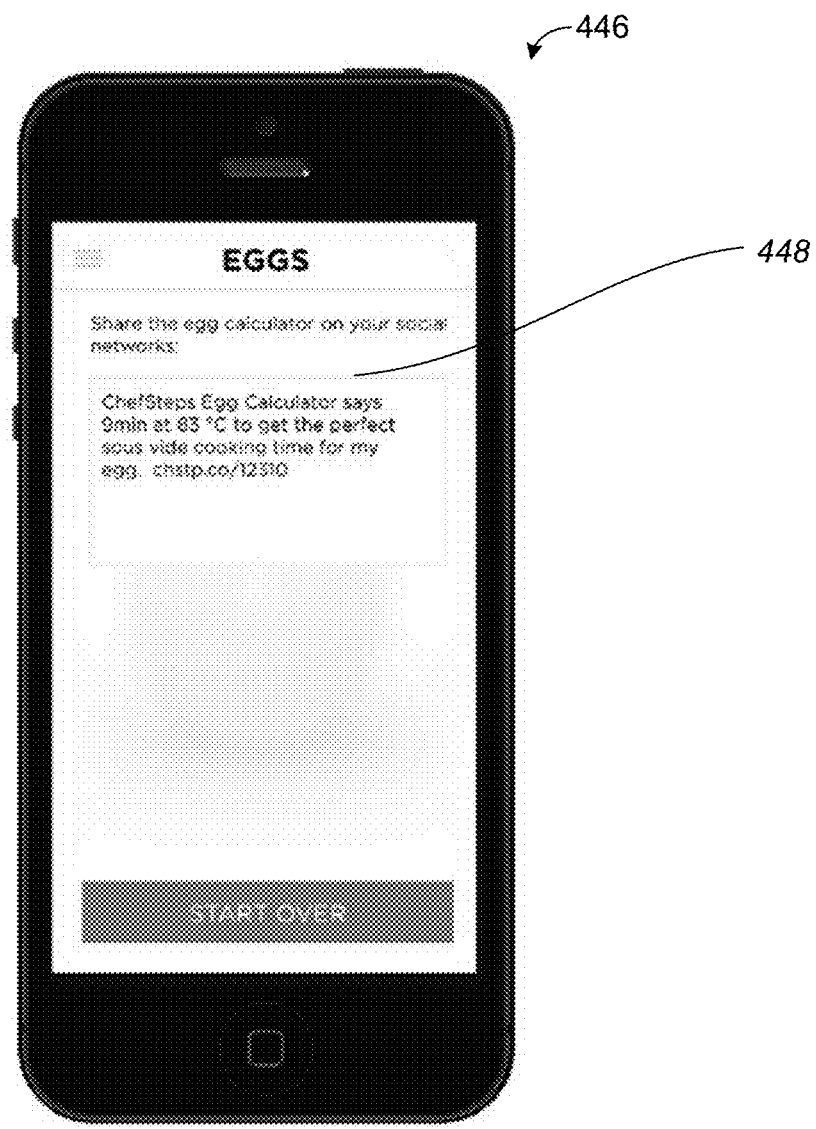

FIG. 4I illustrates a communications screen 446 for an application associated with and FPG system, such as the FPG system 108 of FIG. 1. In this embodiment, the communications screen 446 includes a selectable "share" icon 448 that allows the user to share the cooking instructions results with others, for example, in one of the user's social networks. The communications screen 446 may include various features to facilitate communication using a numerous formats, such as emails, text messages, audio messages, digital posts to social media sites, or the like.

In some implementations, the FPG system may utilize feedback to a priori adjust one or more parameters (e.g., food preparation parameters, prompts, recommendations) for an individual user, group, friends of one or more individual users, geographic locale, or all users. For example, in some implementations the FPG systems gathers ratings from users, and the ratings may be used to adjust one or more parameters or recommendations for one or more users. As another example, the FPG system may gather information manually or automatically from users or from third party entities (e.g., social networks, retail web sites, etc.) that may be used to adjust one or more parameters, recommendations, or other features of the system for one or more users.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a processor-based food preparation guidance system, the method comprising:
    receiving, via a communications device, a request for preparation guidance for a food product;
    in response to the received request, causing an image or video in a first series of images or videos to be displayed by the communications device,
        wherein each image or video in the first series of images or videos depicts the food product after cooking the food product,
        wherein each image or video of the first series of images or videos depicts a different gradation of at least one first characteristic of the food product;
    receiving, via the communications device, a selection of one of the gradations of the at least one first characteristic of the food product;
    in response to receiving the selection of one of the gradations of the at least one first characteristic of the food product, causing an image or video of a subset of a second series of images or videos to be displayed by the communications device, wherein the subset of the second series of images or videos is determined from the second series of images or videos using the selection of one of the gradations of the at least one first characteristic of the food product such that the subset shows images or videos where an outcome of cooking the food product is possible or desirable that are compatible with the first characteristic of the food product, wherein the subset includes a plurality of images or videos;
        wherein each image or video in the second series of images or videos depicts a different gradation of at least one second characteristic of the food product;
    receiving, via the communications device, a selection of one of the gradations of the at least one second characteristic of the food product;
    determining at least one food preparation parameter for the food product based at least in part on the received selections of one of the gradations of the at least one first characteristic and one of the gradations of the at least one second characteristic of the food product; and
    sending the at least one food preparation parameter to a cooking device,
        wherein the cooking device is configured to automatically cook the food product based at least in part on the at least one food preparation parameter.

2. The method of claim 1, further comprising:
    causing the at least one food preparation parameter to be displayed by the communications device.

3. The method of claim 2 wherein receiving a selection of one of the gradations of the at least one first characteristic of the food product comprises receiving, via a communications device, a selection of one of the gradations by a processor-based food preparation guidance system over a data network, and determining at least one food preparation parameter comprises determining at least one food preparation parameter by the food preparation guidance system, and wherein causing the at least one food preparation parameter to be displayed by the communications device comprises sending, by the food preparation guidance system, data comprising the at least one food preparation parameter to the communications device over the data network.

4. The method of claim 2 wherein each image or video in the first series of images or videos depicts different textures, consistencies, or doneness for the food product after cooking the food product.

5. The method of claim 1 wherein receiving a selection of one of the gradations of the at least one first characteristic of the food product comprises receiving, via a communications device, a selection of one of the gradations by a processor-based food preparation guidance system over a data network, and determining at least one food preparation parameter comprises determining at least one food preparation parameter by the food preparation guidance system.

6. The method of claim 1 wherein determining at least one food preparation parameter for the food product comprises determining at least one of a cooking temperature or a cooking time for the food product.

7. The method of claim 1 wherein:
    receiving a request for preparation guidance for a food product comprises receiving a request for preparation guidance for an egg, the egg having a white portion and a yolk portion,
    wherein each of the images or videos in the first series of images or videos depicts a respective different texture, consistency, or doneness of one of the white portion and the yolk portion of a cooked egg,
    wherein receiving a selection of one of the gradations of the at least one first characteristic of the food product comprises receiving a selection of one of the images or videos in the first series of images or videos;
    wherein each of the images or videos in the second series of images or videos depicts a different texture of the other of the white portion and the yolk portion; and
    wherein receiving a selection of one of the gradations of the at least one second characteristic of the food product comprises receiving a selection of one of the images or videos in the second series of images or videos; and
    wherein determining at least one food preparation parameter for the food product comprises determining at least one food preparation parameter for the egg based at least in part on the received selection of one of the images or videos in the first series of images or videos and based at least in part on the received selection of one of the images or videos in the second series of images or videos.

8. The method of claim 7 wherein determining at least one food preparation parameter comprises determining at least one of a cooking time or a cooking temperature for the egg.

9. The method of claim 1, further comprising:
subsequent to determining at least one food preparation parameter for the food product, causing at least one supplemental prompt to be displayed by the communications device;
receiving, via the communications device, a response to the at least one supplemental prompt; and
determining at least one additional food preparation parameter for the food product based at least in part on the received response to the supplemental prompt.

10. The method of claim 9 wherein causing at least one supplemental prompt to be displayed by the communications device comprises causing at least one supplemental prompt to be displayed by the communications device, the at least one supplemental prompt relating to at least one of a physical characteristic of the food product, an environmental condition, or a food preparation condition.

11. The method of claim 9 wherein causing at least one supplemental prompt to be displayed by the communications device comprises causing at least one supplemental prompt to be displayed by the communications device, the at least one supplemental prompt relating to at least one of a size of the food product, a shape of the food product, a class of the food product, a temperature of the food product, an altitude, a geographic location, or a cooking method.

12. The method of claim 1 wherein determining at least one food preparation parameter for the food product comprises determining a time and a duration for cooking the food product in a water bath.

13. A processor-based food preparation guidance system, comprising:
at least one processor; and
at least one nontransitory processor-readable medium storing processor-executable instructions that, when executed by the at least one processor, cause the at least one processor to:
receive a request for preparation guidance for a food product;
in response to the received request, cause an image or video of a first series of images and videos to be displayed by a display of a communications device, wherein each image or video in the first series of images or videos depicts the food product after cooking the food product,
wherein each image or video in the first series of images or videos depicts a different gradation of at least one first characteristic of the food product;
receive a selection of one of the gradations of the at least one first characteristic of the food product;
in response to receiving the selection of one of the gradations of the at least one first characteristic of the food product, cause an image or video of a subset of a second series of images or videos to be displayed by the communications device, wherein the subset of the second series of images or videos is determined from the second series of images or videos using the selection of one of the gradations of the at least one first characteristic of the food product such that the subset shows images or videos where an outcome of cooking the food product is possible or desirable that are compatible with the first characteristic of the food product, wherein the subset includes a plurality of images or videos;
wherein each image or video in the second series of images or videos depicts a different gradation of at least one second characteristic of the food product;
receive, via the communications device, a selection of one of the gradations of the at least one second characteristic of the food product; determine at least one food preparation parameter for the food product based at least in part on the received selection of one of the gradations of the at least one first characteristic and one of the gradations of the at least one second characteristic of the food product; and
send the at least one food preparation parameter to a cooking device, wherein the cooking device is configured to receive the at least one food preparation parameter and automatically cook the food product based at least in part on the at least one food preparation parameter.

14. The processor-based food preparation guidance system of claim 13 wherein the at least one nontransitory processor-readable medium further stores processor-executable instructions that, when executed by the at least one processor, cause the at least one processor to:
cause the at least one food preparation parameter to be displayed by the display of the communications device.

15. The processor-based food preparation guidance system of claim 14 wherein the at least one nontransitory processor-readable medium further stores processor-executable instructions that, when executed by the at least one processor, cause the at least one processor to:
receive, via the communications device, a selection of one of the gradations over a data network; and
send data comprising the at least one food preparation parameter to the communications device over the data network.

16. The processor-based food preparation guidance system of claim 14 wherein each image or video in the first series of images or videos depicts respective different textures, consistencies, or doneness for the food product.

17. The processor-based food preparation guidance system of claim 13 wherein the at least one nontransitory processor-readable medium further stores processor-executable instructions that, when executed by the at least one processor, cause the at least one processor to:
receive a selection of one of the gradations from the communications device over a data network.

18. The processor-based food preparation guidance system of claim 13 wherein the at least one nontransitory processor-readable medium further stores processor-executable instructions that, when executed by the at least one processor, cause the at least one processor to:
cause at least one of a first set of videos to be displayed by the communications device.

19. The processor-based food preparation guidance system of claim 13 wherein the at least one nontransitory processor-readable medium further stores processor-executable instructions that, when executed by the at least one processor, cause the at least one processor to:
determine at least one of a cooking temperature or a cooking time for the food product.

20. The processor-based food preparation guidance system of claim 13 wherein the at least one nontransitory processor-readable medium further stores processor-executable instructions that, when executed by the at least one processor, cause the at least one processor to:

receive a request for preparation guidance for an egg, the egg having a white portion and a yolk portion,
wherein each of the images or videos in the first series of images or videos depicts a respective different texture, consistency, or doneness of one of the white portion and the yolk portion,
wherein each of the images or videos in the second series of images or videos depicts a respective different texture, consistency, or doneness of the other of the white portion and the yolk portion; and
determine at least one food preparation parameter for the egg based at least in part on a received selection of one of the images or videos in the first series of images or videos and based at least in part on a received selection of one of the images or videos in the second series of images or videos.

21. The processor-based food preparation guidance system of claim 20 wherein the at least one nontransitory processor-readable medium further stores processor-executable instructions that, when executed by the at least one processor, cause the at least one processor to:
determine at least one of a cooking time or a cooking temperature for the egg.

22. The processor-based food preparation guidance system of claim 20 wherein the at least one nontransitory processor-readable medium further stores processor-executable instructions that, when executed by the at least one processor, cause the at least one processor to:
cause at least one of a second set of videos to be displayed by the display of the communications device based at least in part on a received selection of one of the videos in a first set of videos.

23. The processor-based food preparation guidance system of claim 13 wherein the at least one nontransitory processor-readable medium further stores processor-executable instructions that, when executed by the at least one processor, cause the at least one processor to:
cause at least one supplemental prompt to be displayed by the display of the communications device;
receive a response to the at least one supplemental prompt; and
determine at least one additional food preparation parameter for the food product based at least in part on the received response to the supplemental prompt.

24. The processor-based food preparation guidance system of claim 23 wherein the at least one supplemental prompt relates to at least one of a physical characteristic of the food product, an environmental condition, or a food preparation condition.

25. The processor-based food preparation guidance system of claim 23 wherein the at least one supplemental prompt relates to at least one of a size of the food product, a shape of the food product, a class of the food product, a temperature of the food product, an altitude, a geographic location, or a cooking method.

26. The processor-based food preparation guidance system of claim 13 wherein the at least one nontransitory processor-readable medium further stores processor-executable instructions that, when executed by the at least one processor, cause the at least one processor to:
determine a time and a duration for cooking the food product in a water bath.

* * * * *